United States Patent [19]

Saegusa

[11] Patent Number: 5,027,768

[45] Date of Patent: Jul. 2, 1991

[54] FUEL INJECTION CONTROL SYSTEM FOR DIESEL ENGINE

[75] Inventor: Shogo Saegusa, Yokohama, Japan

[73] Assignee: Nissan Motor Co., Ltd., Yokohama, Japan

[21] Appl. No.: 542,630

[22] Filed: Jun. 25, 1990

[30] Foreign Application Priority Data

Jun. 27, 1989 [JP] Japan .................... 1-164439

[51] Int. Cl.⁵ ............................................. F02D 7/00
[52] U.S. Cl. ..................................... 123/381; 123/357
[58] Field of Search .............. 123/381, 357, 358, 359, 123/365; 73/119

[56] References Cited

U.S. PATENT DOCUMENTS

| | | | |
|---|---|---|---|
| 3,204,623 | 9/1965 | Isley | 123/381 |
| 4,174,694 | 11/1979 | Wessel | 123/381 |
| 4,252,097 | 2/1981 | Hartford | 123/381 |
| 4,425,889 | 1/1984 | Hachitani | 123/357 |
| 4,601,270 | 7/1986 | Kimberley | 123/357 |
| 4,757,791 | 7/1988 | Hachitani | 123/357 |
| 4,791,904 | 12/1988 | Grieshaber | 123/359 |
| 4,836,166 | 6/1989 | Wietelmann | 123/381 |
| 4,869,218 | 9/1989 | Fehlmann | 123/357 |
| 4,961,412 | 10/1990 | Foruyama | 123/357 |

FOREIGN PATENT DOCUMENTS

| | | | |
|---|---|---|---|
| 0153932 | 9/1984 | Japan | 123/381 |
| 60-36752 | 2/1985 | Japan . | |
| 61-65034 | 4/1986 | Japan . | |
| 62-147036 | 7/1987 | Japan . | |
| 62-189343 | 8/1987 | Japan . | |

OTHER PUBLICATIONS

Yamada et al., "The Second Generation of Electronic Diesel Fuel Injection Systems-Investigation with a Rotary Pump", SAE Technical Paper Series, Feb. 1986, pp. 1-13.

Primary Examiner—Carl Stuart Miller
Attorney, Agent, or Firm—Foley & Lardner

[57] ABSTRACT

In a system for controlling an injection timing are detected an oxygen concentration in an exhaust gas, and a specific gravity of a fuel. A smoke concentration is calculated based on the oxygen concentration and the fuel specific gravity. The fuel injection amount is corrected based on this smoke concentration.

3 Claims, 6 Drawing Sheets $$\Delta S = S - S_0$$

$$\Delta Q = Q - Q_0$$

$$C_Q = \frac{Q_0}{Q_0 + \Delta Q}$$

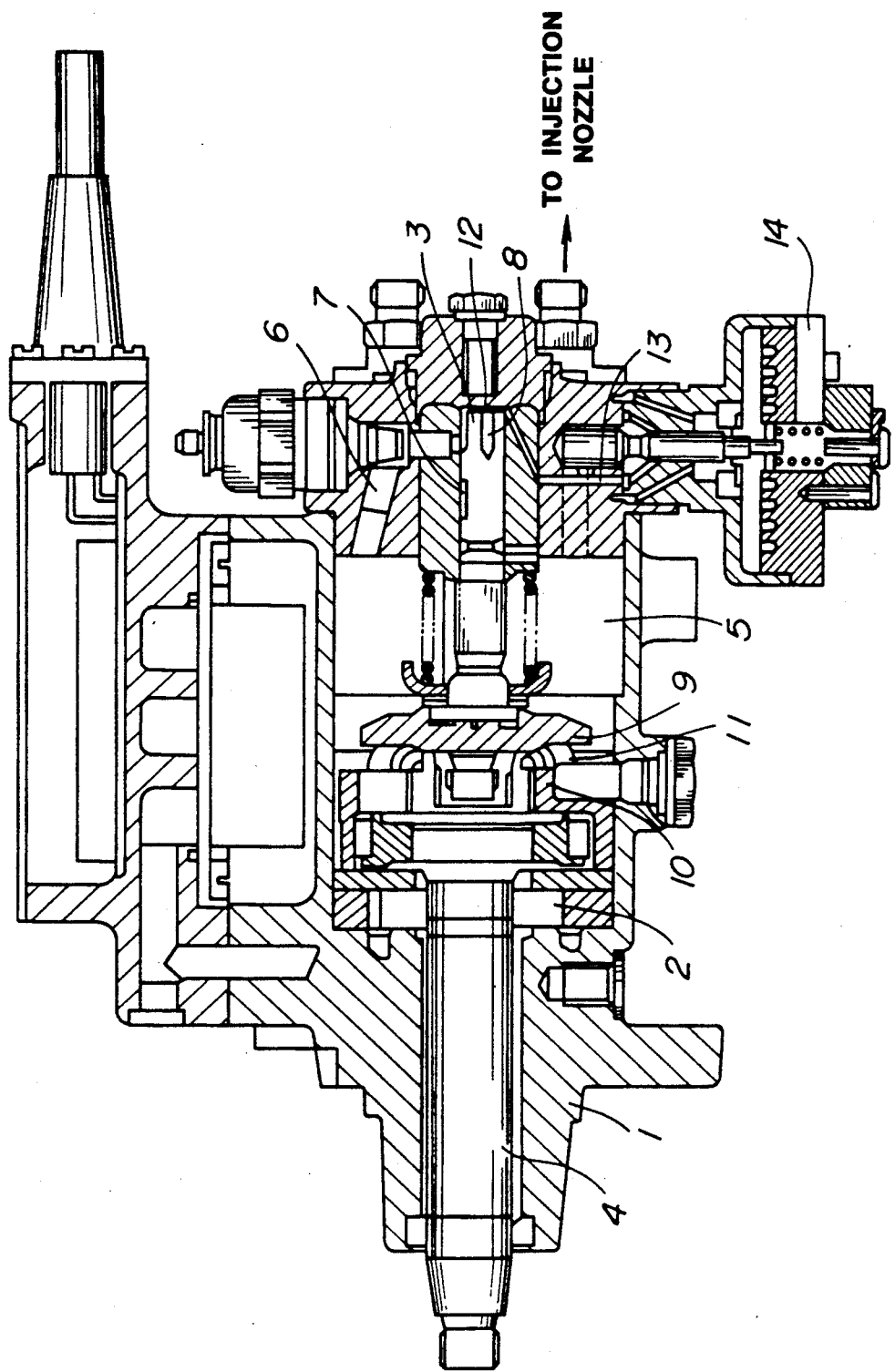

FUEL INJECTION CONTROL SYSTEM FOR DIESEL ENGINE

BACKGROUND OF THE INVENTION

The present invention relates to a fuel injection control system for a diesel engine and, particularly to a control for reducing a discharge of smoke.

Various types of fuel injection apparatus for a diesel engine have been previously proposed. One of such known fuel injection apparatus is, for example, a delivery type fuel injection pump which controls fuel injection timing and amount in an electronic manner (refer to SAE paper 860145, published in February 1986).

Referring to FIG. 6, there is shown a delivery type fuel injection pump as mentioned above. The fuel injection pump includes, within a housing 1, a low-pressure side feed pump 2, and a high-pressure side plunger pump 3 which are driven by a drive shaft 4. Inhaled by the feed pump 2 via a fuel inlet (not shown), a fuel is supplied to a pump chamber 5 arranged within the housing 1, then transferred to the plunger pump 3 via a suction passage 6 which opens to the pump chamber 5.

A plunger 7 of the plunger pump 3 has one end formed with suction slots, and the other end connected to a face cam which is formed with cam grooves. The suction slots corresponds in number to the number of cylinders of an engine, and the cam grooves correspond in number to the number of the engine cylinders. The plunger 7 reciprocates, in rotation with the drive shaft 4, by a predetermined cam lift over a roller 11 arranged to a roller ring 10. The fuel is inhaled into a plunger chamber 12 from the suction slots 8 due to this rotational reciprocating motion of the plunger 7, then transferred from a delivery port (not shown) for each cylinder to an injection nozzle (not shown) via a delivery valve (not shown).

A fuel return passage 13 allows fluid communication of the plunger chamber 12 with the pump chamber 5 of the low-pressure side. Installed therein is an electromagnetic valve 14 of the high speed response type which is driven, in accordance with an engine operating condition, by a signal (drive pulse) from a drive circuit. The electromagnetic valve 14, which is arranged to control a fuel injection, operates such that the fuel injection begins with the valve 14 closed during a compression stroke of the plunger 7, and the fuel injection finishes with the same opened. That is, a fuel injection start timing is controlled by a valve-closing timing, and a fuel injection period (fuel injection amount) is controlled by a valve-closing period.

It is well known that, in exhaust gas of a diesel engine, an oxygen concentration and a smoke concentration are mutually correlated. A fuel injection control system which utilizes such correlation is disclosed, for example, in JP-A 62-189343. This system electronically controls the fuel injection amount based on a signal derived from an oxygen sensor which is installed within an exhaust passage.

Further, it is known that the correlation between the oxygen and smoke concentrations in exhaust gas varies with characteristics of the fuel and, particularly with a specific gravity thereof (see FIG. 3).

The specific gravity of the fuel in general use is variable according to fuel specification and temperature, but the known system is not sensible of variations of the specific gravity of the fuel.

Thus, with a fuel having higher smoke concentration versus oxygen concentration in exhaust gas, the fuel injection amount is such that the smoke concentration exceeds a predetermined reference value thereof, resulting in an increased smoke concentration in exhaust gas. On the other hand, with a fuel having lower smoke concentration versus oxygen concentration in exhaust gas, the fuel injection amount is reduced even if the smoke concentration does not exceed the reference value thereof, resulting in an decreased output of the engine.

SUMMARY OF THE INVENTION

It is, therefore, an object of the present invention to provide a system for controlling a fuel injection in a diesel engine in a manner to fail to exceed a critical value of smoke concentration in accordance with a specific gravity of fuel.

According to one aspect of the present invention, there is provided a system for controlling a fuel injection, comprising:

means for detecting an engine operating condition and generating an engine operating condition indicative signal indicative of said engine operating condition detected;

means for calculating a fuel injection amount based on said engine operating condition indicative signal and generating a fuel injection amount indicative signal indicative of said fuel injection amount calculated;

means for detecting an oxygen concentration in an exhaust gas and generating an oxygen concentration indicative signal indicative of said oxygen concentration detected;

means for detecting a specific gravity of a fuel and generating a specific gravity indicative signal indicative of said specific gravity detected;

means for calculating a smoke concentration based on said oxygen concentration indicative signal and said specific gravity indicative signal and generating a smoke concentration indicative signal; and means for correcting said fuel injection amount based on said smoke concentration indicative signal.

According to another aspect of the present invention, there is provided a method of controlling a fuel injection in a diesel engine, the method comprising the steps of:

detecting an engine operating condition and generating an engine operating condition indicative signal indicative of said engine operating condition detected;

calculating a fuel injection amount based on said engine operating condition indicative signal and generating a fuel injection amount indicative signal indicative of said fuel injection amount calculated;

detecting an oxygen concentration in an exhaust gas and generating an oxygen concentration indicative signal indicative of said oxygen concentration detected;

detecting a specific gravity of a fuel and generating a specific gravity indicative signal indicative of said specific gravity detected;

calculating a smoke concentration based on said oxygen concentration indicative signal and said specific gravity indicative signal and generating a smoke concentration indicative signal; and correcting said fuel injection amount based on said smoke concentration indicative signal.

According to still another aspect of the present invention, there is provided, in a disel engine:

means for injecting a fuel to the engine;

means for detecting an engine operating condition and generating an engine operating condition indicative signal indicative of said engine operating condition detected;

means for calculating a fuel injection amount based on said engine operating condition indicative signal and generating a fuel injection amount indicative signal indicative of said fuel injection amount calculated;

means for detecting an oxygen concentration in an exhaust gas and generating an oxygen concentration indicative signal indicative of said oxygen concentration detected;

means for detecting a specific gravity of a fuel and generating a specific gravity indicative signal indicative or said specific gravity detected;

means for calculating a smoke concentration based on said oxygen concentration indicative signal and said specific gravity indicative signal and generating a smoke concentration indicative signal;

means for correcting said fuel injection amount based on said smoke concentration indicative signal and generating a fuel injection amount correcting signal indicative of said fuel injection amount corrected; and means for effecting operation of said fuel injecting means based on said fuel injection amount correcting signal.

BRIEF DESCRIPTION OF THE DRAWINGS

FIG. 6 is a longitudinal section showing a previously proposed fuel injection pump.

DETAILED DESCRIPTION OF THE INVENTION

Referring to the accompanying drawings, a preferred embodiment of a fuel injection control system for a diesel engine according to the present invention will be described.

Referring again to FIG. 6, a fuel injection pump to which the present invention applied is the same in structure as the conventional one as mentioned hereinbefore.

Figure 1:
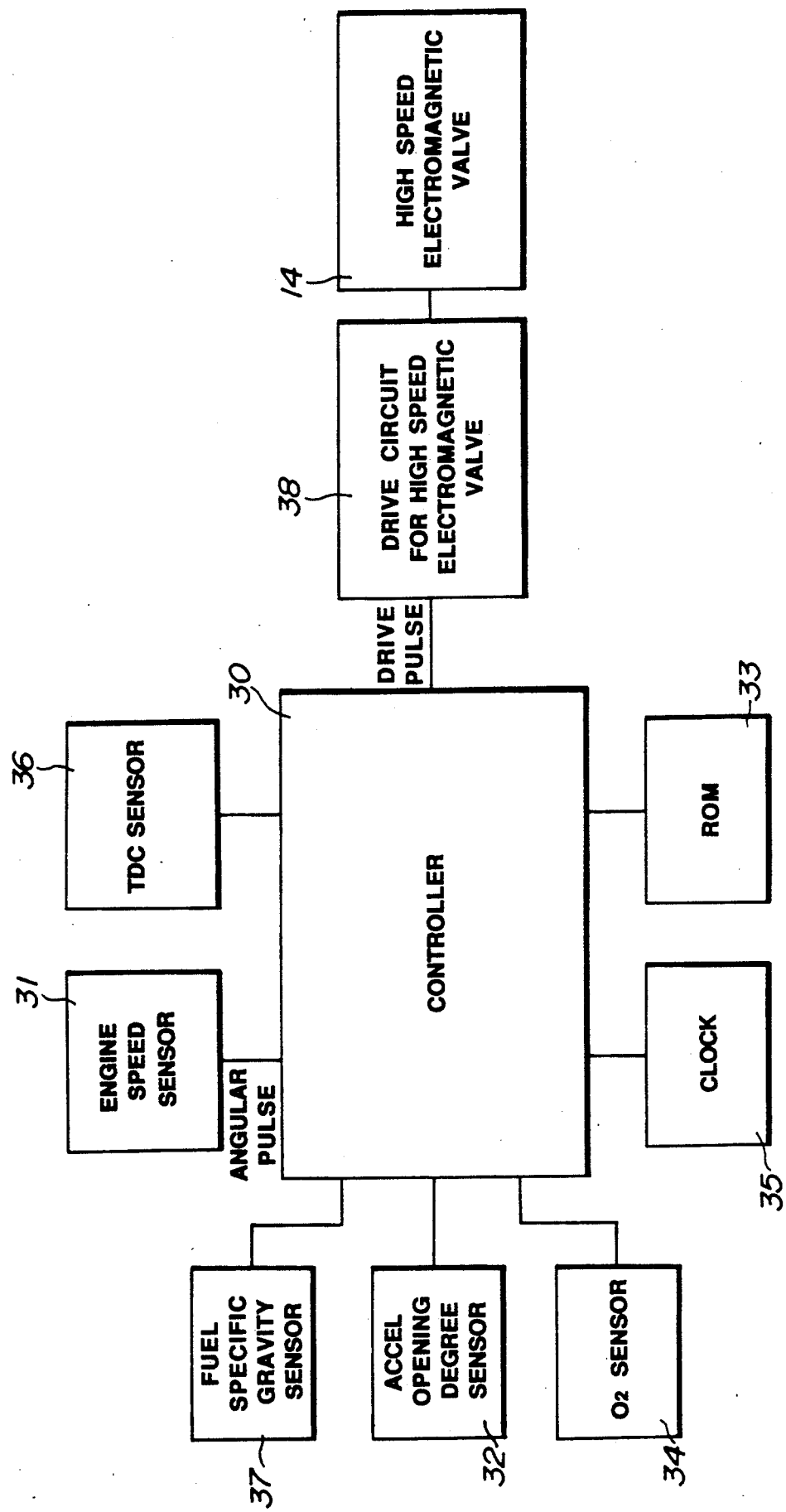
FIG. 1 is a block diagram showing a preferred embodiment of a fuel injection control system for a diesel engine.

Referring to FIG. 1, there is shown a control system for a high speed response type electromagnetic valve 14 which controls fuel injection timing and period.

A controller 30 receives different parameters for detecting an engine operating condition such as an engine speed signal (angular pulse) derived from an engine speed sensor 31, and a load signal derived from an accelerator opening degree sensor 32, and determines a fuel injection amount from a map which is previously stored in a read only memory (ROM) 33. The controller 30 also receives signals derived from a clock 35 and a top dead center (TDC) sensor 36.

Additionally, connected to the controller 30 are an oxygen (0$_2$) sensor 34 which is installed within an exhaust pipe so as to detect an oxygen concentration in exhaust gas, and a specific gravity sensor 37 for detecting a specific gravity of fuel.

Figure 2:
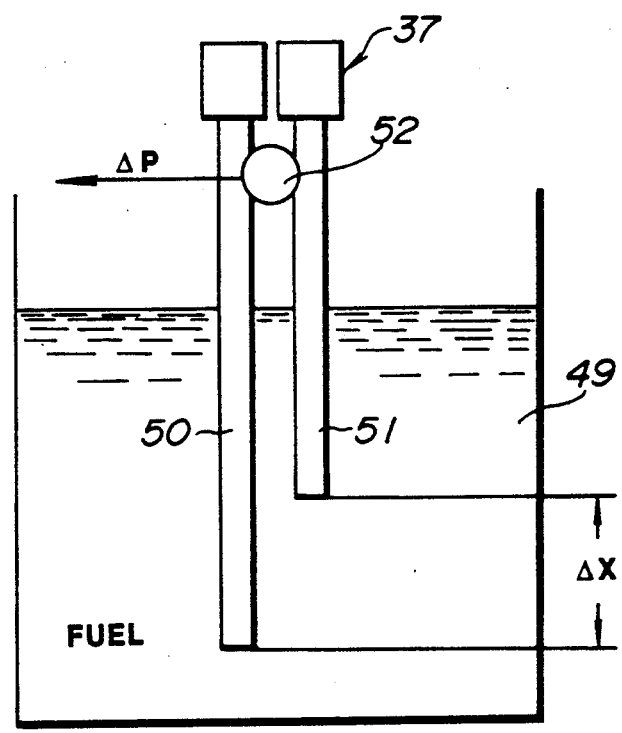
FIG. 2 is a schematic representation showing a fuel specific gravity sensor.

Referring to FIG. 2, the fuel specific gravity sensor 37 is fixedly mounted to two air pipes 50 and 51 which are partly immersed in the fuel of a fuel tank 49. There is a predetermined difference $\Delta X$ (delta X) between a setting height of a lower end opening of the air pipe 50 and the same of the air pipe 51. A piezoelectric-crystal element 52 transforms into an electric signal a differential pressure $\Delta P$ (delta P) of air filled in the two air pipes 50 and 51. The difference $\Delta X$ (delta X) is constant so that the differential pressure $\Delta P$ (delta P) of air is in proportion to the specific gravity of fuel. Thus, a value of the specific gravity of fuel is detectable by measuring the differential pressure $\Delta P$ (delta P). The fuel specific gravity sensor 37 is not limited to the air pipe type as mentioned above, but may be of the float type.

Based on two signals derived from the O$_2$ sensor 34 and the specific gravity sensor 37, the controller 30 calculates a current value of the smoke concentration from the map which is previously stored in the ROM 33. Then, the controller 30 compares the current value of the smoke concentration and a reference value thereof which is also previously stored in the ROM 33. If the current value of the smoke concentration is more than the reference value, the controller 30 sets a new fuel injection amount by subtracting a predetermined value from the fuel injection amount as mentioned above. On the other hand, if the current value is equal to or less than the reference value, the controller 30 keeps this fuel injection amount, and outputs, in response to this fuel injection amount, a command in the form of a drive pulse to the electromagnetic valve 14 of the fuel injection pump via a drive circuit 38 for the electromagnetic valve 14.

Figure 5:
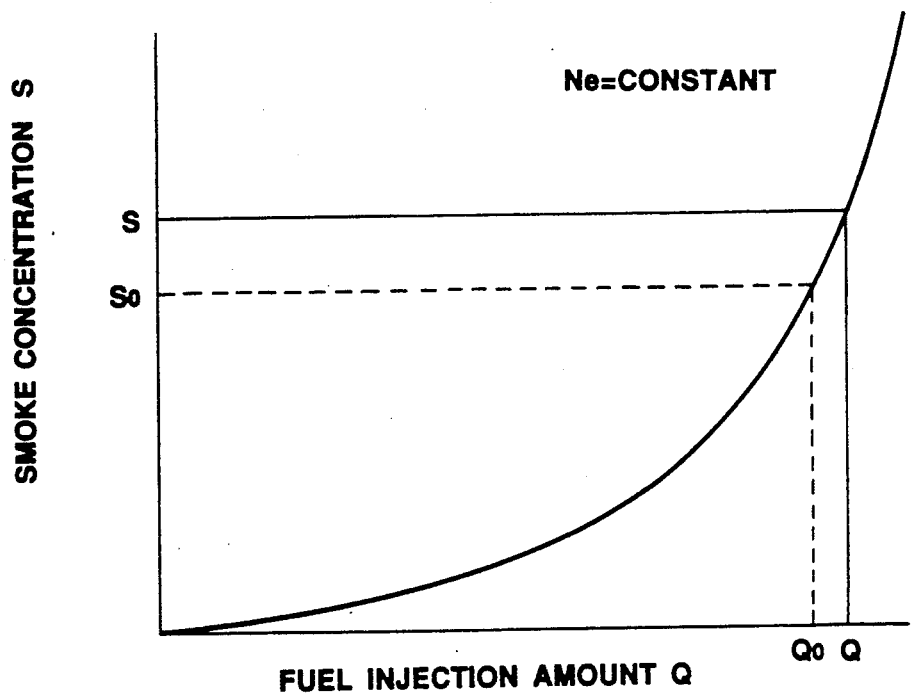
FIG. 5 is a view similar to FIG. 3, but showing a test result of smoke concentration vs. fuel injection amount.

Referring to FIG. 5, there is shown a flowchart of a basic control executed by the controller 30 for correcting the fuel injection amount.

At a step 100 and a subsequent step 101, an engine speed N$_e$ and an accelerator opening degree A$_{cc}$ are read in a random access memory (RAM) (not shown), respectively.

At a step 102, a basal fuel injection amount Q$_o$ is calculated from a map which is previously stored in the ROM 33 based on the engine speed N$_e$ and the accelerator opening degree A$_{cc}$.

At a step 103 and a subsquent step 104, an output value V$_{o2}$ of the O$_2$ sensor 34 and the same $\rho$ (rho) of the specific gravity sensor 37, respectively.

Subsequently, at a step 105, a current smoke concentration S is calculated from a map which is previously stored in the ROM 33 based on the output value V$_{o2}$ of the O$_2$ sensor 34 and the same $\rho$ (rho) of the fuel specific gravity sensor 37, and the control proceeds to a step 106.

At the step 106, it is determined whether the current smoke concentration S is more than a predetermined reference value S$_o$ or not. If the current smoke concentration S is less than or equal to the predetermined reference value S$_o$ which is set previously, the control proceeds to a step 110 in which the basal fuel injection amount Q$_o$ is outputted without correcting the same. On the other hand, if the current smoke concentration S is more than the predetermined reference value S$_o$, the control proceeds to a step 107 so as to correct the basal fuel injection amount Q$_o$.

At the step 107, a difference ΔS (delta S) between the current smoke concentration S and the predetermined reference value $S_o$ is calculated:

$$\Delta S = S - S_o$$

Subsequently, at a step 108, a correction factor $C_Q$ of the fuel injection amount Q is read from a map which is previously stored in the ROM 33 based on the difference ΔS (delta S). It is to be noted that the correction factor $C_Q$ is less than 1. The fuel injection amount Q and the smoke concentration S are mutually correlated as shown in FIG. 5. According to this correlation, the correction factor $C_Q$ is stored in the ROM 33 in the form of a two-dimensional map of the engine speed $N_e$ and the difference ΔS (delta S). Specifically, assuming that $\Delta Q = Q - Q_o$, the correction factor $C_Q$ is expressed by the following formula:

$$C_Q = \frac{Q_o}{Q_o + \Delta Q}$$

At a subsequent step 109, a corrected fuel injection amount $Q_A$ is obtained by multiplying the basal fuel injection amount $Q_o$ by the correction factor $C_Q$.

Finally, at a step 110, the corrected fuel injection amount $Q_A$ is outputted to cause the fuel injection pump to inject fuel, then the control comes to an END, and returns to a START.

Figure 3:
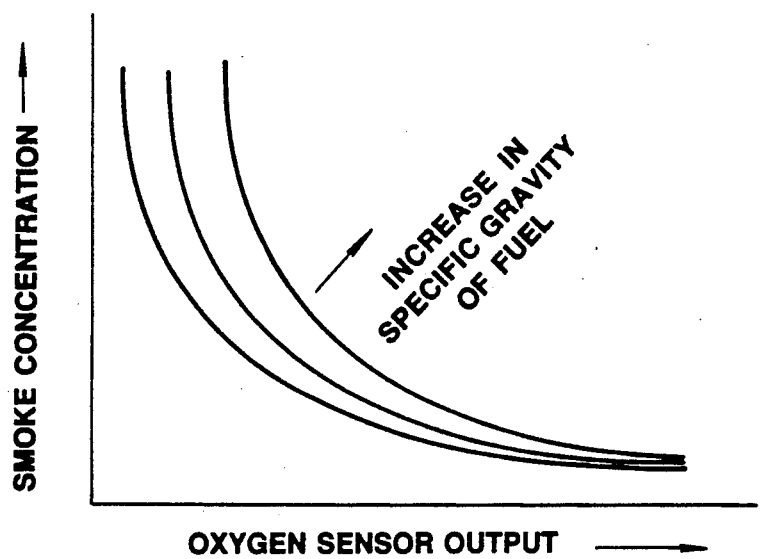
FIG. 3 is a graphical representation showing a test result of smoke concentration vs. oxygen sensor output.
Figure 4:
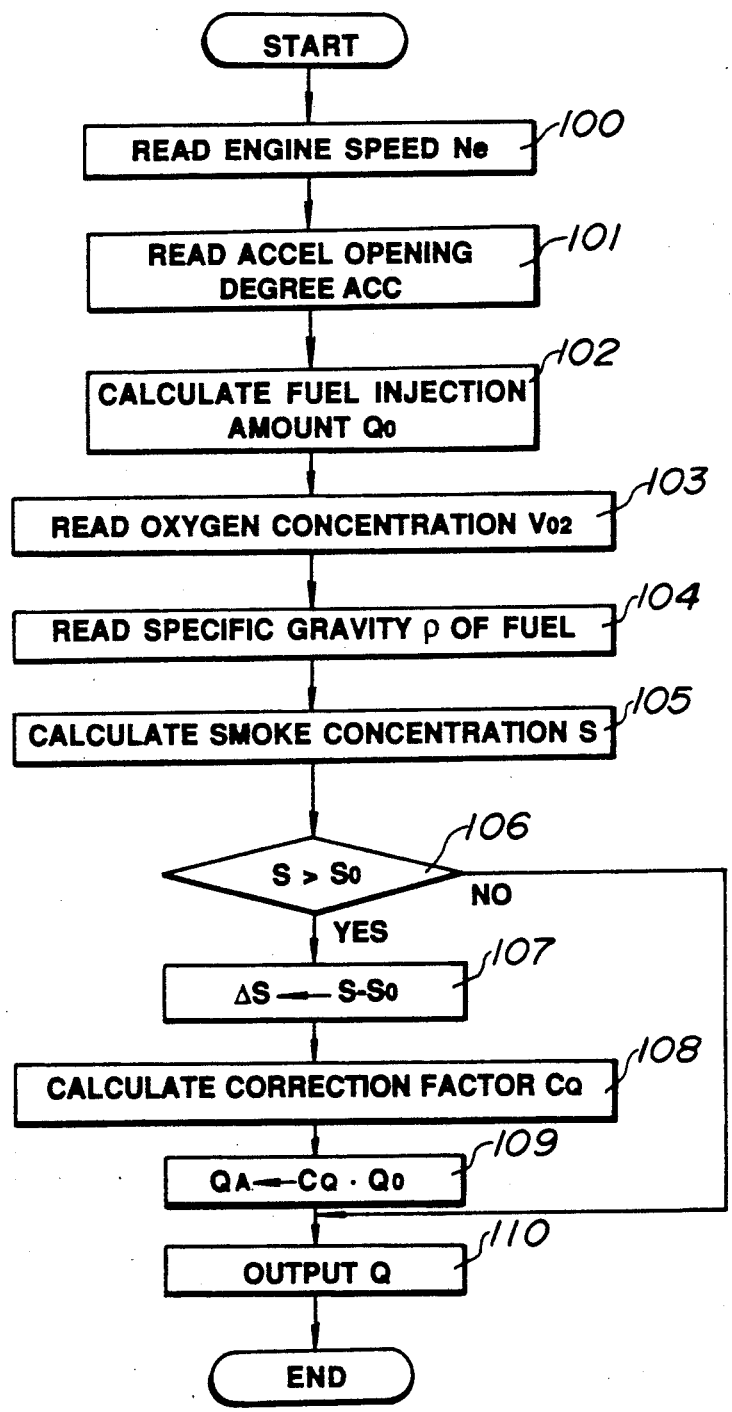
FIG. 4 is a flowchart showing a basic control executed by a controller.

Referring to FIG. 3, in exhaust gas of the diesel engine, the correlation between the oxygen concentration and the smoke concentration is variable with the specific gravity of fuel.

It is to be noted that the fuel with high specific gravity is inclined to have high smoke concentration versus the oxygen concentration in exhaust gas. Since the fuel injection amount is corrected in accordance with an actual fuel specific gravity in a decreased manner, the smoke concentration is restricted to less than the predetermined reference value.

Further, it is to be noted that the fuel with low specific gravity is inclined to have low smoke concentration versus the oxygen concentration in exhaust gas. Since the fuel injection amount is corrected in accordance with an actual fuel specific gravity in an increased manner, an engine output is prevented from lowering due to decreased fuel injection amount when the actual fuel specific gravity does not exceed the predetermined reference value.

What is claimed is:

1. A system for controlling an injection quantity, comprising:

means for detecting an engine operating condition and generating an engine operating condition indicative signal indicative of said engine operating condition detected;

means for calculating a fuel injection amount based on said engine operating condition indicative signal and generating a fuel injection amount indicative signal indicative of said fuel injection amount calculated;

means for detecting an oxygen concentration in an exhaust gas and generating an oxygen concentration indicative signal indicative of said oxygen concentration detected;

means for detecting a specific gravity of a fuel and generating a specific gravity indicative signal indicative of said specific gravity detected;

means for calculating a smoke concentration based on said oxygen concentration indicative signal and said specific gravity indicative signal and generating a smoke concentration indicative signal; and means for correcting said fuel injection amount based on said smoke concentration indicative signal.

2. A method of controlling a fuel injection in a diesel engine, the method comprising the steps of:

detecting an engine operating condition and generating an engine operating condition indicative signal indicative of said engine operating condition detected;

calculating a fuel injection amount based on said engine operating condition indicative signal and generating a fuel injection amount indicative signal indicative of said fuel injection amount calculated;

detecting an oxygen concentration in an exhaust gas and generating an oxygen concentration indicative signal indicative of said oxygen concentration detected;

detecting a specific gravity of a fuel and generating a specific gravity indicative signal indicative of said specific gravity detected;

calculating a smoke concentration based on said oxygen concentration indicative signal and said specific gravity indicative signal and generating a smoke concentration indicative signal; and correcting said fuel injection amount based on said smoke concentration indicative signal.

3. In a diesel engine:

means for injecting a fuel to the engine;

means for detecting an engine operating condition and generating an engine operating condition indicative signal indicative of said engine operating condition detected;

means for calculating a fuel injection amount based on said engine operating condition indicative signal and generating a fuel injection amount indicative signal indicative of said fuel injection amount calculated;

means for detecting an oxygen concentration in an exhaust gas and generating an oxygen concentration indicative signal indicative of said oxygen concentration detected;

means for detecting a specific gravity of a fuel and generating a specific gravity indicative signal indicative of said specific gravity detected;

means for calculating a smoke concentration based on said oxygen concentration indicative signal and said specific gravity indicative signal and generating a smoke concentration indicative signal;

means for correcting said fuel injection amount based on said smoke concentration indicative signal and generating a fuel injection amount correcting signal indicative of said fuel injection amount corrected; and means for effecting operation of said fuel injecting means based on said fuel injection amount correcting signal.

* * * * *